United States Patent
Shane et al.

(10) Patent No.: US 8,272,362 B2
(45) Date of Patent: Sep. 25, 2012

(54) ENGINE CONTROL METHOD AND SYSTEM

(75) Inventors: Michael Daniel Shane, Detroit, MI (US); James David Pakko, Dearborn, MI (US); Paul M. Laing, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/075,019

(22) Filed: Mar. 29, 2011

(65) Prior Publication Data
US 2011/0209685 A1    Sep. 1, 2011

(51) Int. Cl.
*F02B 3/00* (2006.01)
*F01N 3/00* (2006.01)
*F01N 3/10* (2006.01)
(52) U.S. Cl. ............. 123/299; 123/305; 60/295; 60/300
(58) Field of Classification Search .................. None
See application file for complete search history.

(56) References Cited

U.S. PATENT DOCUMENTS

| | | | |
|---|---|---|---|
| 6,032,753 A | 3/2000 | Yamazaki et al. | |
| 7,155,899 B2* | 1/2007 | Beer et al. | 60/284 |
| 7,178,327 B2 | 2/2007 | Miyashita | |
| 2006/0070014 A1 | 3/2006 | Liu et al. | |
| 2006/0130463 A1 | 6/2006 | Miura | |
| 2007/0256666 A1 | 11/2007 | Cunningham et al. | |
| 2009/0070014 A1 | 3/2009 | Miyashita | |
| 2009/0133391 A1 | 5/2009 | Porten et al. | |
| 2010/0263639 A1* | 10/2010 | Uhrich et al. | 123/564 |

* cited by examiner

*Primary Examiner* — Stephen K Cronin
*Assistant Examiner* — Sherman Manley
(74) *Attorney, Agent, or Firm* — Julia Voutyras; Alleman Hall McCoy Russell & Tuttle LLP (57) ABSTRACT

Methods and systems are provided for heating a catalyst during engine cold-start conditions. One example embodiment uses positive valve overlap to drive a boosted blow-through airflow through the cylinders of an engine. Fuel is injected with the blow-through airflow during the valve overlap, and also injected into engine cylinders outside the valve overlap. The catalyst is heated by the resulting exothermic reaction of the blow-through airflow with the combustion products and the injected fuel in the exhaust manifold.

9 Claims, 8 Drawing Sheets

ENGINE CONTROL METHOD AND SYSTEM

FIELD

The present description relates generally to a method and system for operating a combustion engine.

BACKGROUND/SUMMARY

Engine out cold-start emissions generated before light-off of an exhaust system catalytic converter may contribute a large percentage of the total exhaust emissions. To expedite the attainment of the catalyst light-off temperature, engine systems may inject air into the exhaust manifold to combust unburned fuel remaining in the exhaust. Additionally, or optionally, the injection of air may be supplemented with additional fuel to substantially increase the exhaust temperature and thereby decrease the light-off time.

One example of such an engine system is provided by Uhrich et al. in US 2010/0263639. Herein, during an engine cold-start, an engine is operated with positive valve overlap while a turbocharger compressor is driven at least partially by a motor. In this way, a blow-through air flow is generated into the engine exhaust manifold through the cylinders of the engine. Fuel is injected with the blow-through air. The blow-through air exothermically reacts with the fuel in the exhaust and heats up the exhaust catalyst.

However, the inventors herein have recognized potential issues with such a system. As one example, the approach relies on a single fuel injection to heat the engine catalyst as well as attain the desired exhaust air-to-fuel ratio. Since the amount of heat directed to the catalyst is then adjusted with the blow-through air flow, the system may be heat limited. As another example, the approach uses a rich cylinder fuel injection in conjunction with the blow-through airflow to attain the desired air-to-fuel ratio in the exhaust mixture. However, during some engine cold-start conditions, a lean cylinder fuel injection may be desired (for example, to reduce exhaust NOx emissions). As such, the approach of Uhrich is incapable of heating the catalyst and providing a stoichiometric exhaust air-to-fuel ratio with a lean injection.

Thus, in one example, some of the above issues may be at least partly addressed by a method of operating a boosted engine. One example embodiment comprises, during an engine cold start, operating the engine with positive intake to exhaust valve overlap to drive a boosted blow-through airflow into an engine exhaust through engine cylinders. The method further comprises, injecting a first amount of fuel during the valve overlap, injecting a second amount of fuel outside of the valve overlap, and exothermically reacting the blow-through airflow with fuel in the exhaust.

In one example, a vehicle engine may include a turbocharger coupled between the engine intake and the engine exhaust. During an engine cold start, for example before a catalyst light-off temperature is attained, an engine may be operated with positive intake to exhaust valve overlap, while the turbocharger compressor is operated to drive a boosted blow-through airflow through the engine cylinders, into the exhaust manifold. During the valve overlap, a first amount of fuel may be injected into a cylinder, along with the blow-through airflow. A second amount of fuel may be injected and combusted in the same cylinder outside of the valve overlap. For example, the second amount of fuel may be injected after the valve overlap, but while still in the intake stroke of the same combustion cycle. Alternatively, the second amount of fuel may be injected outside of (e.g., before) the valve overlap, but while still in the intake stroke of the immediately preceding combustion cycle. In still other examples, the first and second amounts may be injected into different cylinders, the cylinders selected based on their firing order. For example, the selection of cylinders may allow the blow-through mixture and the cylinder combustion mixture to be generated at substantially the same time in the different cylinders and then mixed in the engine exhaust.

As such, the total amount of fuel injected (i.e., first and second injection amounts combined) may be adjusted to provide a final desired exhaust gas mixture air-to-fuel ratio (e.g., around stoichiometry). A split ratio of the first injection amount relative to the second injection amount in the total amount of fuel injected may be adjusted based on engine operating conditions, including an exhaust catalyst temperature, to provide a desired heat of oxidation. For example, when the exhaust catalyst is at a lower temperature, the first injection amount may be increased while the second injection amount is correspondingly decreased. The resultant rich blow-through air-fuel mixture can be mixed with the lean cylinder combustion mixture to generate a stoichiometric exhaust gas mixture wherein the rich blow-through air-fuel mixture increases the heat delivered to the exhaust catalyst while the lean cylinder combustion reduces cold-start exhaust NOx emission. In an alternate example, when the exhaust catalyst is at a higher temperature (but still below the light-off temperature), the first injection amount may be decreased, while the second injection amount is correspondingly increased. The resultant lean blow-through air-fuel mixture can be mixed with the rich cylinder combustion mixture to also generate a stoichiometric exhaust gas mixture wherein the lean blow-through air-fuel mixture decreases the heat delivered to the exhaust catalyst while the rich cylinder combustion is used to maintain engine torque and exhaust air-fuel ratio.

In this way, by injecting some fuel while boosted air is directed though the cylinders, fuel may be mixed thoroughly with blow-through air before reaching the catalyst. By combusting some fuel in an engine cylinder during a subsequent intake stroke, and mixing the cylinder combusted exhaust gas with the blow-through air-fuel mixture in the exhaust manifold, the resultant exhaust gas mixture can be used to expedite attainment of catalyst light-off conditions. Specifically, an exothermic reaction of the blow-through air-fuel mixture with the products of the cylinder combustion (including remaining unburned fuel, and burned fuel products such as short chain hydrocarbons (HCs) and carbon-monoxide (CO)) may be promoted to raise the temperature at the exhaust catalyst. By varying the relative amount of fuel in the two injections, the amount of oxidation heat directed to the catalyst can be varied while maintaining the exhaust mixture at stoichiometry. By rapidly increasing the catalyst temperature, the catalyst light-off time may be decreased and the quality of emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
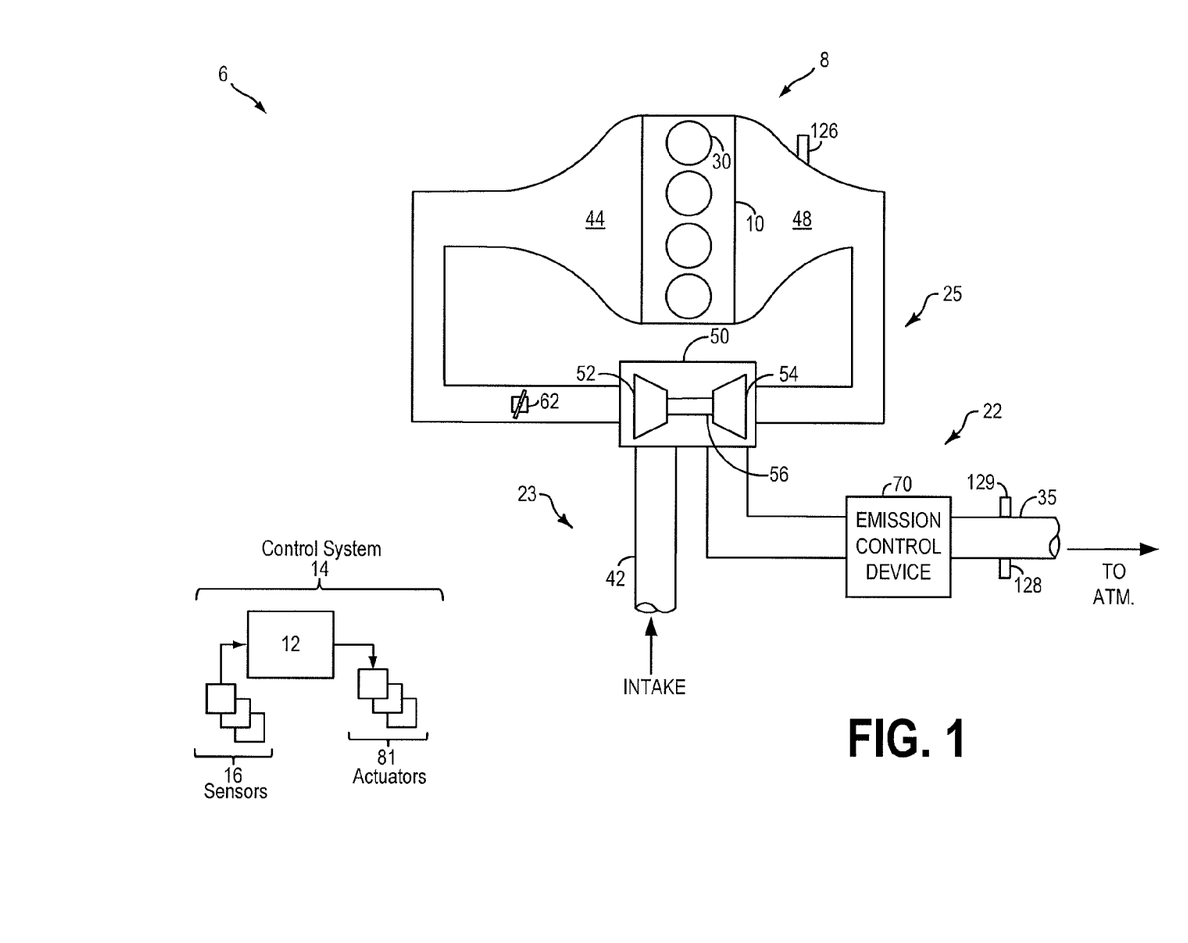
FIG. 1 shows a schematic depiction of a vehicle system including an engine and an associated exhaust after-treatment system.
Figure 2:
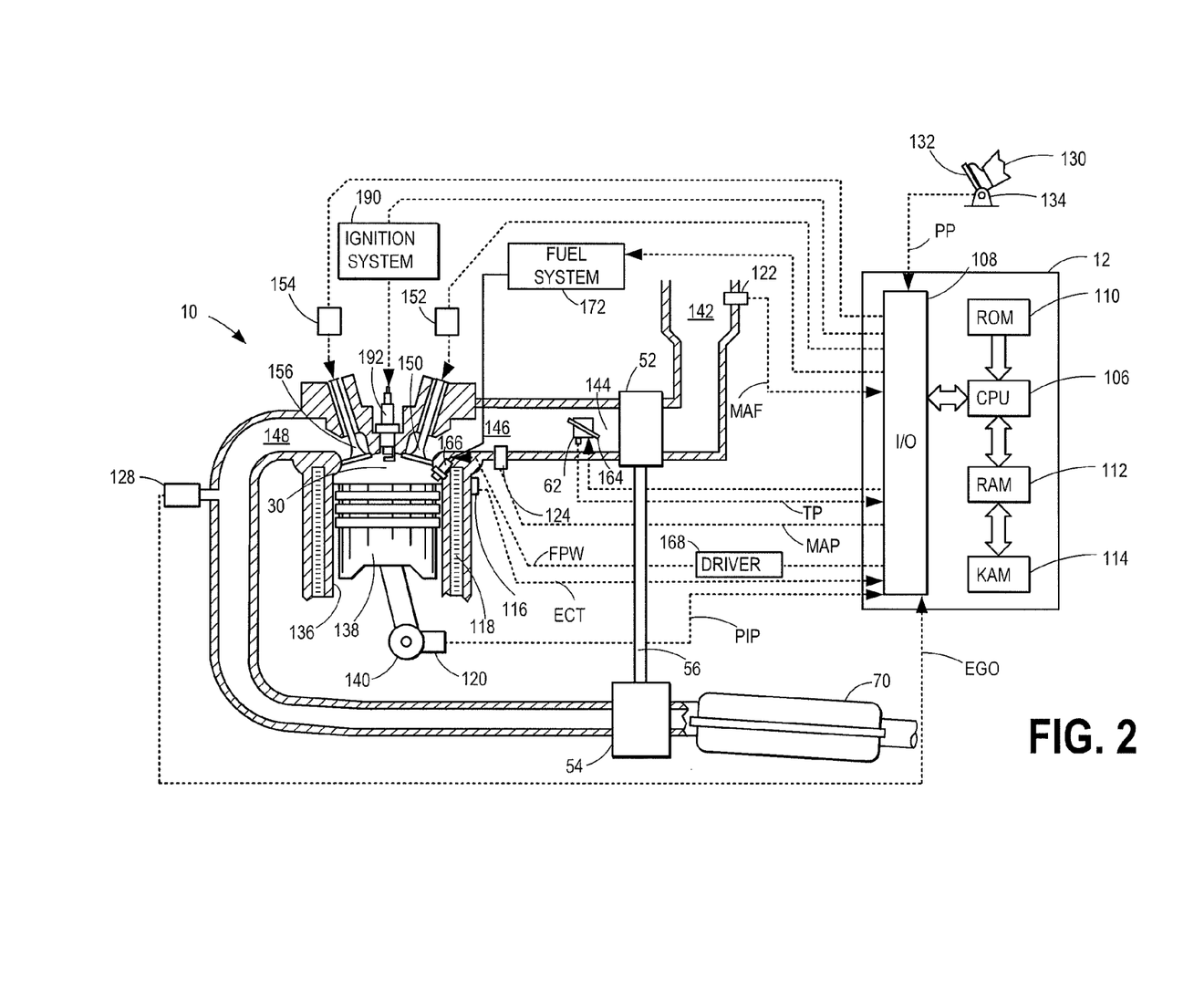
FIG. 2 shows a partial engine view.
Figure 3:
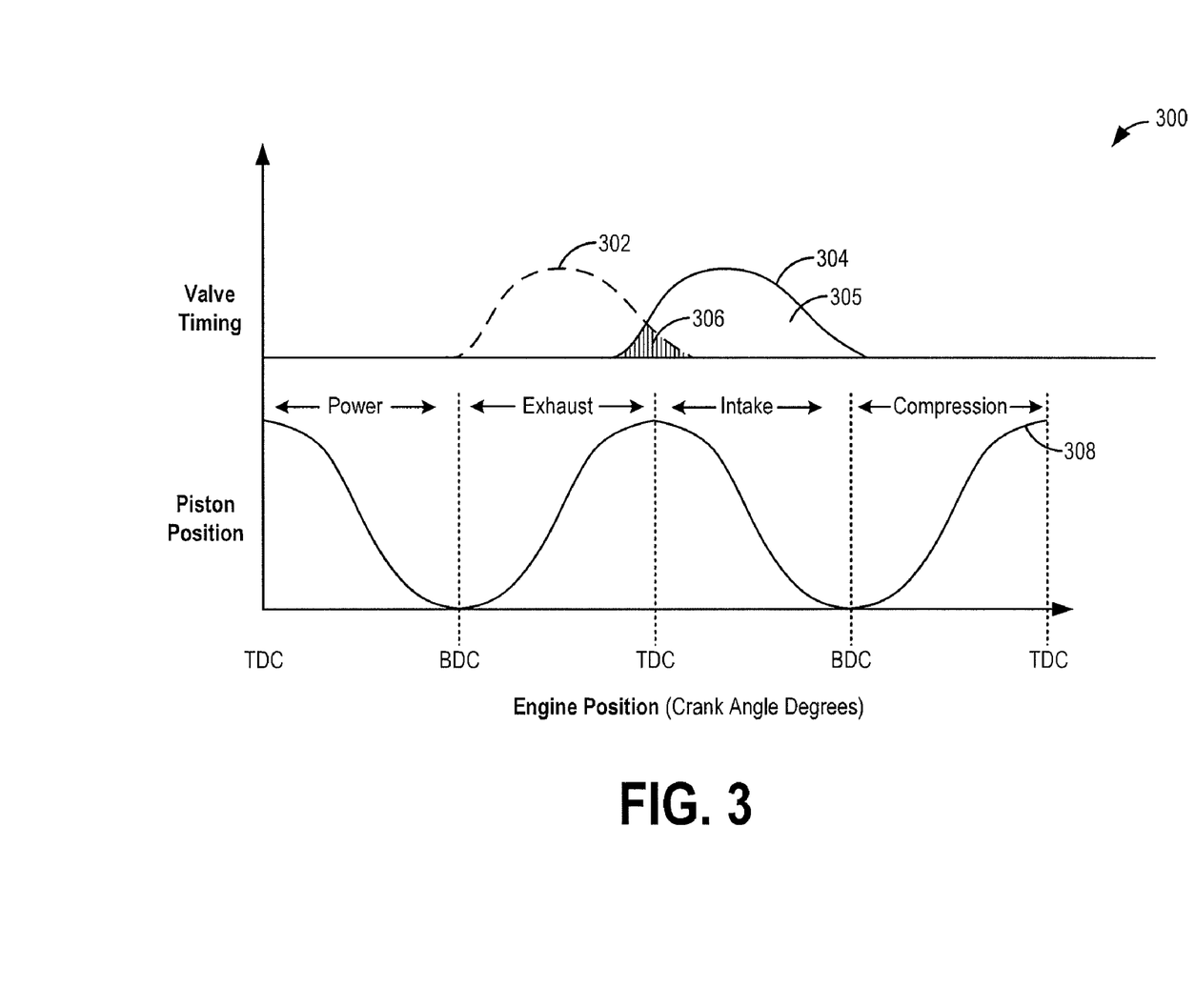
FIG. 3 shows a map depicting engine positive intake to exhaust valve overlap.

The following description relates to systems and methods for reducing the amount of time needed for a catalyst light-off temperature to be attained in an exhaust after-treatment system coupled to a vehicle engine, as depicted in FIGS. 1-2. By supplying a boosted aircharge through the engine cylinders, during positive valve overlap (as depicted in FIG. 3), and injecting some fuel with the boosted blow-through air, oxidation heat may be directed towards the exhaust catalyst. Further, by injecting and combusting additional fuel in an engine cylinder, and combining the products of the cylinder combustion with the blow-through mixture at the exhaust manifold, an exothermic reaction may be provided at the exhaust catalyst to substantially increase the catalyst temperature. An engine controller may be configured to perform control routines, such as those depicted in FIGS. 5-6, during an engine cold start, to generate fresh blow-through air flow through the cylinders by driving an engine boosting device (such as a turbocharger). The controller may further adjust an amount of fuel injected with the blow-through air during the positive valve overlap, and an amount of fuel injected into the cylinder outside of the valve overlap based on a desired heat of oxidation. Example maps, such as those shown in FIGS. 4 and 7, may be used to determine when to inject the fuel, as well as which cylinder to inject the fuel in. Example blow-through air-fuel mixtures and cylinder combustion mixtures that can be used to increase the exhaust catalyst temperature are shown in FIG. 7. By increasing the exhaust temperature, and expediting attainment of a catalyst light-off temperature, the quality of vehicle cold-start emissions may be significantly improved.

FIG. 1 shows a schematic depiction of a vehicle system 6. The vehicle system 6 includes an engine system 8 coupled to an exhaust after-treatment system 22. The engine system 8 may include a boosted engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger. Turbocharger 50 may include a compressor 52, arranged between intake passage 42 and intake manifold 44. Compressor 52 may be powered by exhaust turbine 54, arranged between exhaust manifold 48 and exhaust passage 35. Compressor 52 may be coupled to exhaust turbine 54 via shaft 56. As such, once the engine has run for a sufficient amount of time (for example, a threshold time, a threshold number of combustion cycles, or an amount of time to bring the exhaust gas to a threshold temperature), the exhaust gas generated in the exhaust manifold may start to drive exhaust turbine 54.

Engine exhaust 25 may be coupled to exhaust after-treatment system 22 along exhaust passage 35. Exhaust after-treatment system 22 may include one or more emission control devices 70, which may be mounted in a close-coupled position in the exhaust passage 35. One or more emission control devices may include a three-way catalyst, lean NOx filter, SCR catalyst, etc. The catalysts may enable toxic combustion by-products generated in the exhaust, such as NOx species, unburned hydrocarbons, carbon monoxide, etc., to be catalytically converted to less-toxic products before expulsion to the atmosphere. However, the catalytic efficiency of the catalyst may be largely affected by the temperature of the exhaust gas. For example, the reduction of NOx species may require higher temperatures than the oxidation of carbon monoxide. Unwanted side reactions may also occur at lower temperatures, such as the production of ammonia and $N_2O$ species, which may adversely affect the efficiency of exhaust treatment, and degrade the quality of exhaust emissions. Thus, catalytic treatment of exhaust gas may be delayed until the catalyst(s) have attained a light-off temperature. Additionally, to improve the efficiency of exhaust gas after-treatment, it may be desirable to expedite the attainment of the catalyst light-off temperature.

Figure 5:
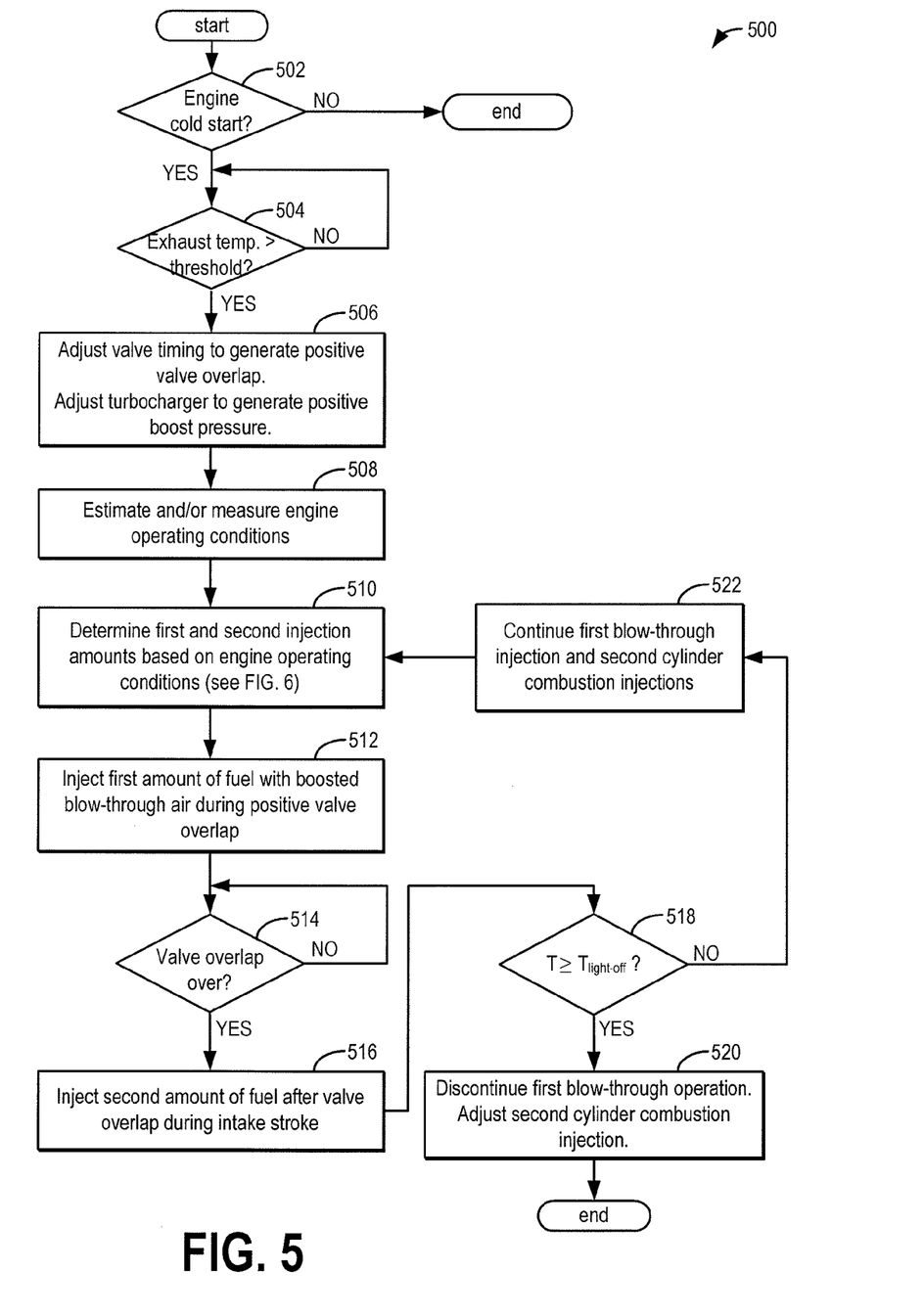
FIGS. 5-6 show high level flow charts illustrating routines that may be implemented for expediting attainment of a catalyst light-off temperature using a blow-through air-fuel mixture and a cylinder combustion mixture.
Figure 6:
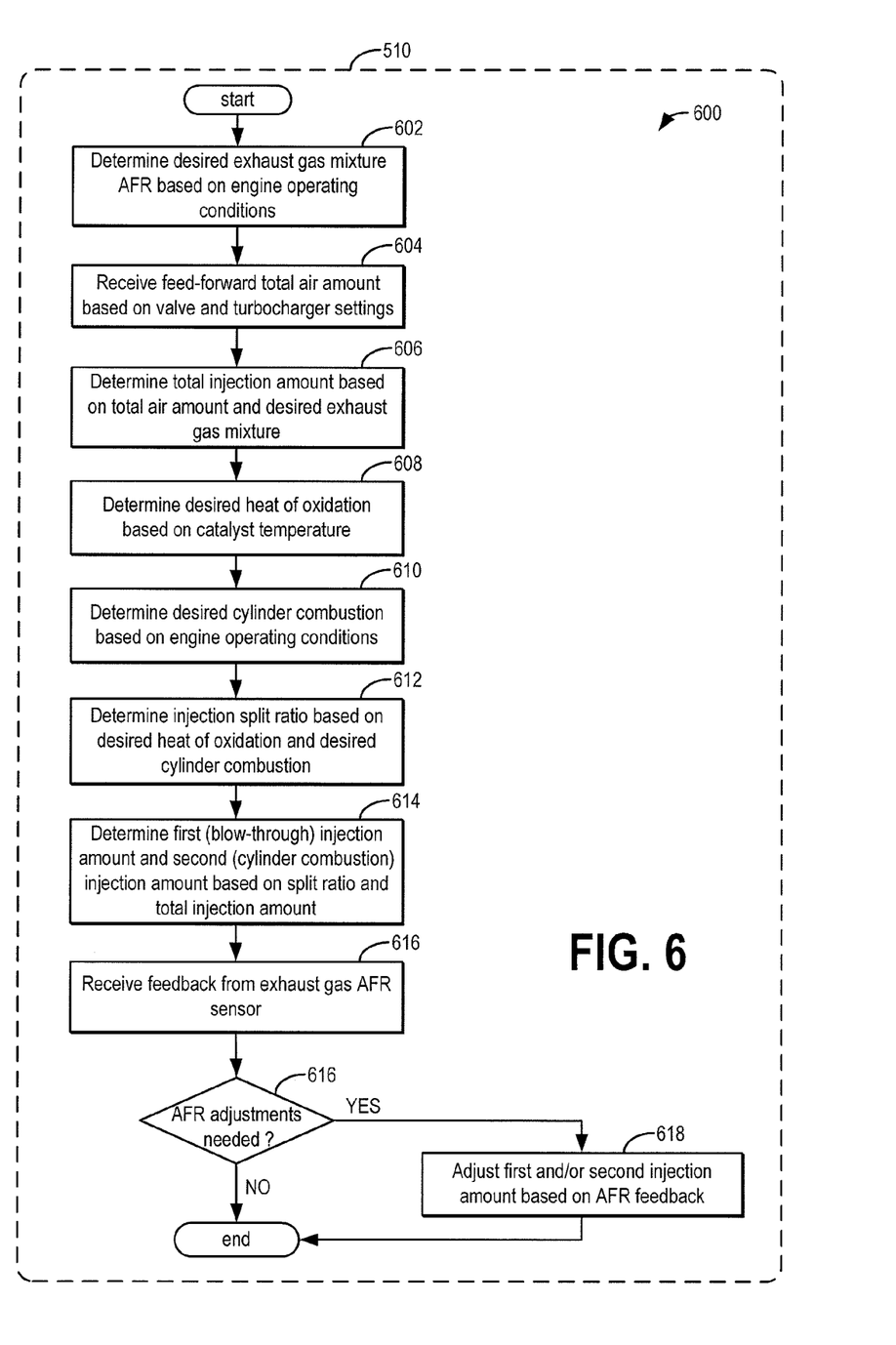
Figure 7:
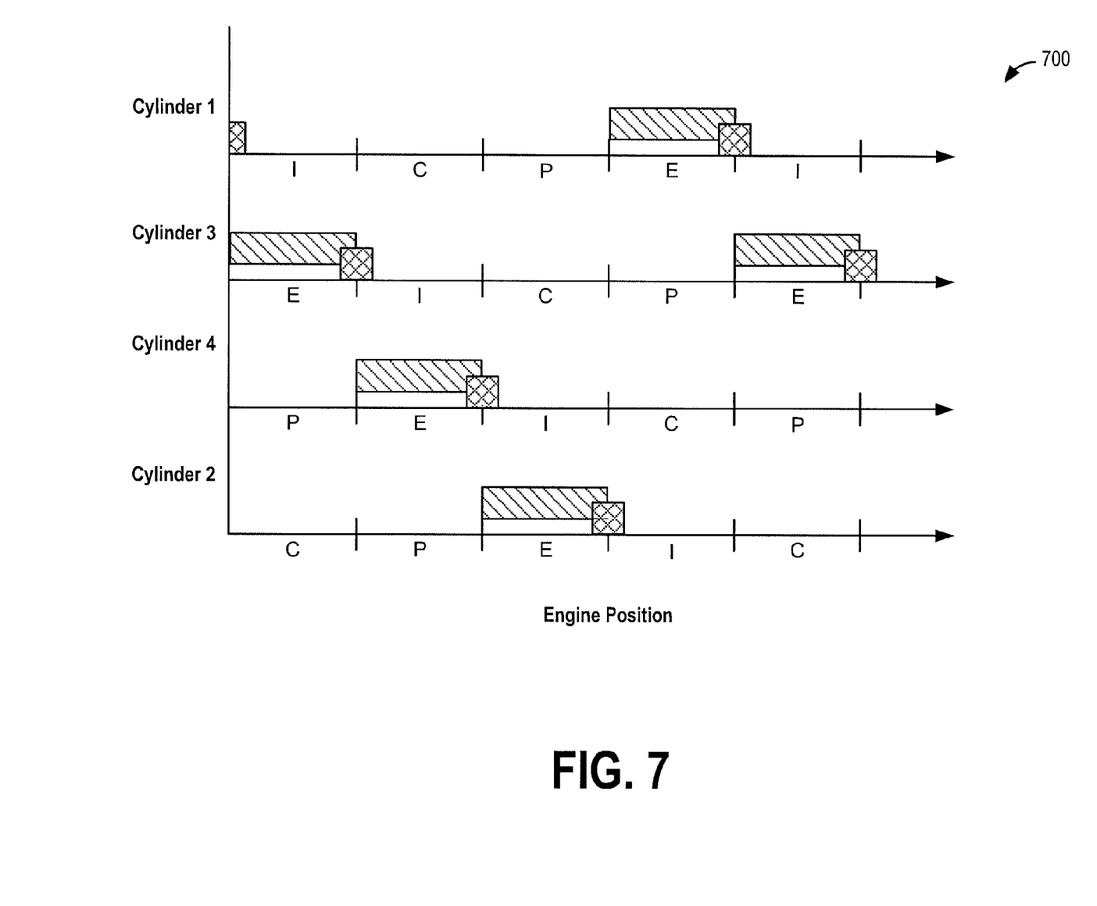
FIG. 7 shows a map, depicting engine cycles in different cylinders of the engine, that may be used to select cylinders for generating the blow-through air-fuel mixture and the cylinder combustion mixture.

As further elaborated herein with reference to FIGS. 5-6, an engine controller may be configured to generate a blow-through air-fuel mixture in the exhaust manifold, during an engine cold start, to reduce the light-off time. The blow-through air-fuel mixture may be generated by driving an amount of boosted air (herein also referred to as a blow-through airflow), and an associated fuel injection, through the engine cylinders into the exhaust manifold, during a positive intake to exhaust valve overlap period (as shown in FIG. 3). This may be supplemented (e.g. followed or preceded) by the generation of a cylinder combustion mixture by performing a cylinder fuel injection and cylinder combustion, outside of the valve overlap period, but during an intake stroke (e.g. of an intake stroke preceding or succeeding that valve overlap period). The blow-through mixture may be mixed, and exothermically reacted, with the cylinder combustion mixture in the exhaust manifold to generate a heated exhaust gas mixture that can help bring the catalytic converter quickly up to an operating temperature.

Exhaust after-treatment system 22 may also include hydrocarbon retaining devices, particulate matter retaining devices, and other suitable exhaust after-treatment devices (not shown). It will be appreciated that other components may be included in the engine such as a variety of valves and sensors, as further elaborated in the example engine of FIG. 2.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, and pressure sensor 129 (located downstream of emission control device 70). Other sensors such as pressure sensors, temperature sensors, air-to-fuel ratio sensors, oxygen sensors, and composition sensors may be coupled to various locations in the vehicle system 6, as discussed in more detail herein. As another example, the actuators may include fuel injectors (not shown), a variety of valves, and throttle 62. The control system 14 may include a controller 12. The controller may receive input data from the various sensors, process the input data, and trigger the actuators in response to the processed input data, based on instruction or code programmed therein, corresponding to one or more routines. An example control routine is described herein with reference to FIGS. 5-6.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 52 arranged between intake passages 142 and 144, and an exhaust turbine 54 arranged along exhaust passage 148. Compressor 52 may be powered by exhaust turbine 54 via a shaft 56. A throttle 62 including a throttle plate 164 may be provided along an intake passage of the engine for varying the flow rate and/or pressure of intake air provided to the engine cylinders. For example, throttle 62 may be disposed downstream of compressor 52 as shown in FIG. 2, or may be alternatively provided upstream of compressor 52.

Exhaust passage 148 can receive exhaust gases from other cylinders of engine 10 in addition to cylinder 30. Exhaust gas sensor 128 is shown coupled to exhaust passage 148 upstream of emission control device 70. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 70 may be a three way catalyst (TWC), NOx trap, various other emission control devices, or combinations thereof.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including fuel injector 166 coupled directly to cylinder 30. Herein, fuel injector 166 is configured as a direct fuel injector for direct injecting fuel into the engine cylinder. Fuel injector 166 may inject fuel directly therein in proportion to the pulse width of signal FPW received from controller 12 via electronic driver 168. In this manner, fuel injector 166 provides what is known as direct injection (hereafter referred to as "DI") of fuel into combustion cylinder 30. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injector 166 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor (not shown); and absolute manifold pressure signal (MAP) from sensor 124. Engine speed signal, RPM, may be generated by controller 12 from signal PIP (or the crankshaft position sensor). Manifold pressure signal MAP from a manifold pressure sensor may be used to provide an indication of vacuum, or pressure, in the intake manifold. Storage medium read-only memory 110 can be programmed with computer readable data representing instructions executable by processor 106 for performing the methods described below as well as other variants that are anticipated but not specifically listed.

As described above, FIG. 2 shows only one cylinder of a multi-cylinder engine. As such each cylinder may similarly include its own set of intake/exhaust valves, fuel injector(s), spark plug, etc.

FIG. 3 shows a map 300 of valve timing and piston position, with respect to an engine position, for a given engine cylinder. During an engine cold-start, an engine controller may be configured to operate an engine boosting device, such as a turbocharger, to drive a boosted blow-through air flow into the exhaust manifold. The blow-through air flow may be driven through the engine cylinders while operating the engine with positive intake to exhaust valve overlap. Additionally, a first amount of fuel may be injected with the blow-through air flow during the positive overlap period. The injected fuel may be mixed thoroughly with the blow-through air to generate a blow-through air-fuel mixture that is exothermically reacted in the exhaust manifold to increase an exhaust catalyst temperature. The engine controller may use a map, such as map 300, to identify the positive valve overlap period.

Map 300 illustrates an engine position along the x-axis in crank angle degrees (CAD). Curve 308 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 308, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 302) and an intake valve (solid curve 304) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 306 (or simply, positive valve overlap), represented by a hatched region at the intersection of curves 302 and 304. In one example, the positive intake to exhaust valve overlap 306 may be a default cam position of the engine present during an engine cold start.

In one example, an engine controller may inject a first amount of fuel during the positive valve overlap period (that is, when in region 306 of the map) to generate a blow-through mixture while injecting a second amount of fuel in the same combustion cycle after the valve overlap period, but before the intake stroke ends (that is, in region 305, which does not overlap with region 306), to generate a combustion mixture. The blow-through mixture may then be reacted with the cylinder combustion mixture in the exhaust manifold to heat an exhaust catalyst. As elaborated in the map of FIG. 7, in alternate examples, the controller may inject the first amount of fuel during the positive overlap period in one engine cylinder, while injecting the second amount of fuel in the same cylinder, or an alternate cylinder, outside the valve overlap period, but in the intake stroke of a different combustion cycle (e.g., a preceding or succeeding combustion cycle).

Figure 4:
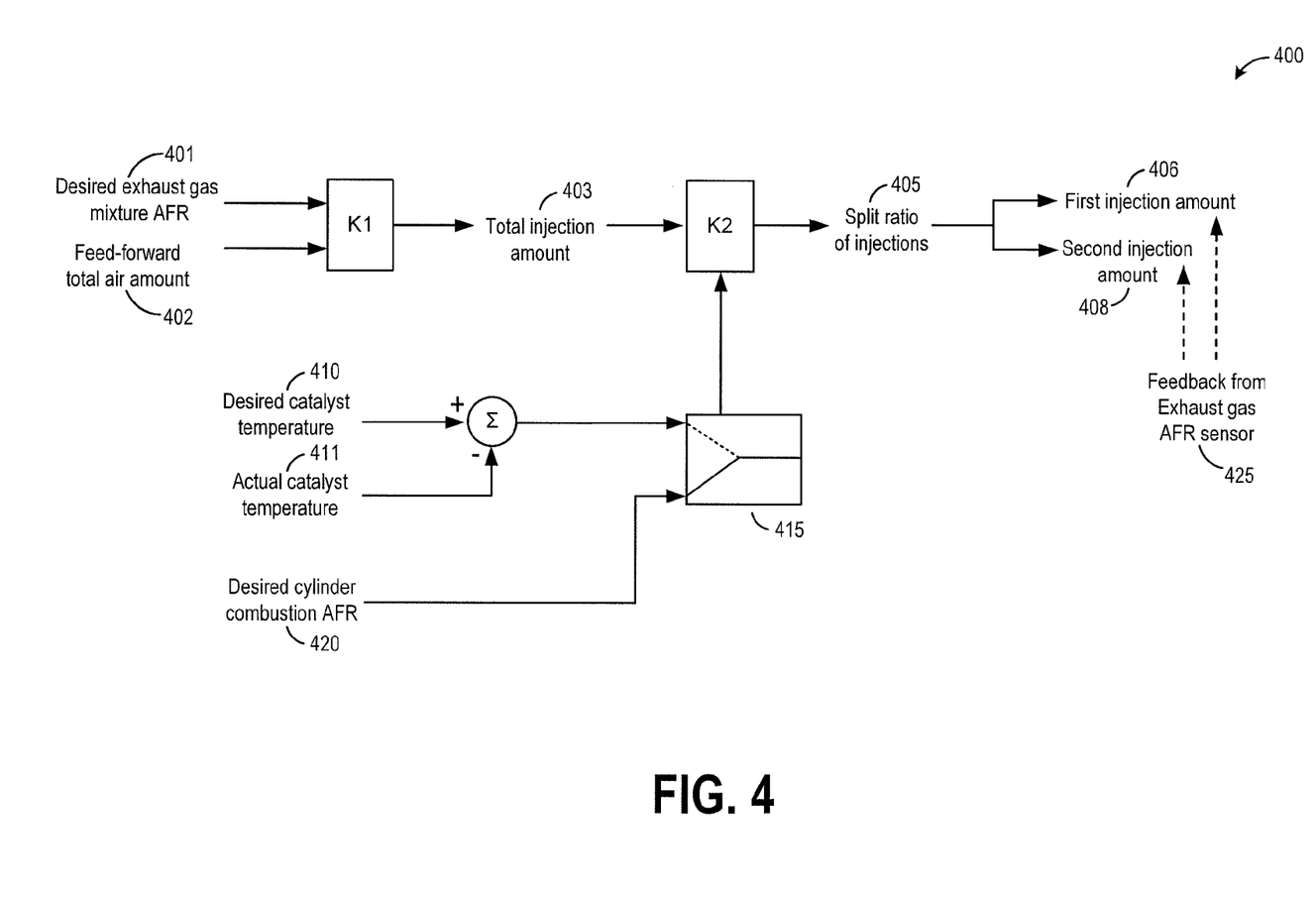
FIG. 4 shows a schematic depiction of an injection determination routine

Now turning to FIG. 4, a schematic depiction 400 of an example method for adjusting an amount of fuel injected with the blow-through air flow in the blow-through mixture and an amount of fuel in the cylinder combustion mixture, to heat an exhaust catalyst, is shown.

A desired exhaust gas mixture air-to-fuel ratio (AFR) 401 and a feed-forward total air amount 402 may be input into a first controller K1 to determine a total fuel injection amount 403. As such, the desired exhaust gas mixture air-to-fuel ratio 401 and the total fuel injection amount 403 may be determined based on engine operating conditions and settings. For example, it may be desired to maintain the exhaust gas mixture air-to-fuel ratio substantially at stoichiometry. Likewise, based on engine valve settings, cam settings, boost settings, etc., a feed-forward total air amount 402 may be determined. A second controller K2 may be configured to determine a split ratio of injections 406 based on the feed-forward total air amount 402 and the desired exhaust gas mixture air-to-fuel ratio 401. That is, second controller K2 may determine how much of the total fuel injection amount is injected into a cylinder as a first injection amount with the blow-through air-flow and how much is injected as a second injection amount in a cylinder (e.g., same or different cylinder) for combustion with the cylinder combustion air-flow.

Second controller K2 may determine the split ratio 405 based on input from switch 415. Switch 415, in turn, receives inputs regarding a desired cylinder combustion air-to-fuel ratio 420 and a desired heat of oxidation 412. The desired heat of oxidation 412 is based on deviation of an actual exhaust catalyst temperature 411 from a desired exhaust catalyst temperature 410. Based on engine operating conditions, and a comparison of the desired heat of oxidation relative to the desired heat of cylinder combustion, a position of switch 415 may be adjusted, and an input provided to second controller K2 accordingly changed.

As such, for improved exhaust emissions, it may be desired to maintain the exhaust catalyst at or above a light-off temperature. Thus, for example, during engine cold-start conditions, when there is a larger difference between the desired exhaust catalyst temperature and the actual exhaust catalyst temperature, switch 415 may be moved to a position that gives more weight to the heat of oxidation relative to the cylinder combustion. In comparison, during engine running, when the exhaust catalyst is already warmed up, switch 415 may be moved to a position that gives more weight to cylinder combustion and maintenance of a desired cylinder combustion air-to-fuel ratio relative to the desired heat of oxidation.

Based on the position of switch 415 and the total injection amount 403, the split ratio 405 of injections may be calculated. This includes determining a first fuel injection amount 406 and a second fuel injection amount 408. The first fuel injection amount 406 corresponds to fuel that is injected into an engine cylinder with a boosted blow-through airflow during a positive overlap period while the second fuel injection amount 408 corresponds to fuel that is injected into an engine cylinder outside the valve overlap period, but within an intake stroke (in the same combustion cycle, or a different combustion cycle). Thus, when a higher heat of oxidation is desired, the split ratio may be adjusted such that more fuel is injected in the first injection (while correspondingly less fuel is injected in the second injection), thereby increasing the amount of heat directed to the catalyst. In comparison, when maintenance of a desired cylinder combustion air-to-fuel ratio is desired, the split ratio may be adjusted such that more fuel is injected in the second injection (while correspondingly less fuel is injected in the first injection) to decrease the amount of heat directed to the catalyst and increase cylinder combustion. In this way, by varying the relative amount of fuel in the two injections, the amount of oxidation heat directed to the catalyst can be varied while maintaining the exhaust mixture at a desired air-to-fuel ratio.

Now turning to FIG. 5, an example routine 500 is shown for performing a supplementary blow-through air and fuel injection operation during an engine cold start, while operating the engine with positive intake to exhaust overlap, in the vehicle system of FIG. 1. The routine enables the compressor of an engine intake boosting device to be operated to generate blow-through air flow in the exhaust while some fuel is injected and mixed with the blow-through air-flow to generate a blow-through mixture in the exhaust manifold. Upon mixing the blow-through mixture with combusted exhaust gas from a subsequent cylinder combustion event, an exhaust gas mixture may be generated in the exhaust manifold. In doing so, exothermic events in the exhaust manifold may be promoted and an exhaust temperature may be rapidly increased, thereby reducing a catalyst light-off time.

At 502, an engine cold start condition may be confirmed. The engine cold start condition may include at least one of an exhaust catalyst temperature being below a threshold temperature (such as a light-off temperature), and the engine being in an engine-off condition for greater than a threshold duration. If an engine cold start condition is not present, the routine may end. At 504, it may be determined whether the exhaust temperature has reached a threshold temperature. As such, the threshold temperature may correspond to an exhaust temperature above which exhaust gas may start to drive the turbocharger turbine. In other words, the turbine may not be operated (without assist), and no boost may be generated, for a number of combustion cycles since the engine cold-start, until the exhaust temperature rises to the threshold temperature. Upon confirmation, at 506, intake and/or exhaust valve timings may be adjusted to operate the engine with a positive intake to exhaust valve overlap. In one example, a positive valve overlap may be the default cam position such that the positive valve overlap is present at the time of engine cold start. An engine controller may be configured to use a map, such the map of FIG. 3, to identify cam timings corresponding to the desired positive intake to exhaust valve overlap period. Also at 506, turbocharger settings may be adjusted (e.g., a turbocharger compressor may be operated) to generate positive boost pressure.

At 508, engine operating conditions may be estimated, and/or measured. As such, these may include, but not be limited to, engine temperature, engine coolant temperature, exhaust temperature, catalyst temperature, engine speed, manifold pressure, barometric pressure, etc. In one example, the catalyst temperature may be inferred from the exhaust temperature. In another example, the catalyst temperature and/or the exhaust temperature may be further compared to a threshold temperature, such as a catalyst light-off temperature, and a temperature difference may be determined.

At 510, based on the estimated engine operating conditions, including a comparison of the desired heat of oxidation relative to the desired cylinder combustion air-to-fuel ratio (or cylinder heat), as well as a desired exhaust air-to-fuel ratio, the first and second injection amounts may be determined. As elaborated in FIGS. 4 and 6, this includes adjusting a split ratio of the first injection amount relative to the second injection amount based at least on an exhaust catalyst temperature. For example, the first injection amount may be increased relative to the second injection amount as a difference between the exhaust catalyst temperature and a threshold temperature (e.g., light-off temperature) increases, while maintaining a total injection amount constant. However, the sum of the first and second injection amounts may be adjusted to maintain an overall air-to-fuel ratio in the exhaust at a desired air-to-fuel ratio (e.g., substantially at stoichiometry).

At 512, the first amount of fuel may be injected during the positive valve overlap period along with the boosted blow-through airflow (that is, an exhaust stroke injection). In this way, a boosted blow-through mixture may be driven into the engine exhaust through the engine cylinders. At 514, it may be confirmed whether the positive valve overlap period is over. If yes, then at 516, the controller may inject the second amount of fuel in the same combustion cycle as the first injection, after the valve overlap but before the intake valve closes (that is, within the intake stroke). In one example, the engine controller may use the map of FIG. 3 to identify cam timings where the positive valve overlap period is over but the intake valve has not closed. The second injection amount may be combusted in the cylinder to generate a cylinder combustion mixture.

As a result of the injections, the blow-through mixture may exothermically react with the cylinder combustion mixture in the exhaust manifold, near the exhaust catalyst, thereby heating the catalyst. At 518, it may be confirmed whether the temperature of the exhaust catalyst is at or above a threshold temperature, such as a light-off temperature ($T_{light-off}$). If the light-off temperature has not been attained, that is, the catalyst has not been sufficiently heated, then at 522, the routine may return to 510 to continue adjusting a fuel distribution between the first and the second injection amounts to provide a desired heat of oxidation. If the light-off temperature has been attained, that is, the catalyst has been sufficiently heated, then at 520, the first blow-through operation may be discontinued while the second fuel injection is adjusted based on the desired cylinder combustion and exhaust air-to-fuel ratio. In one example, discontinuing the first blow-through operation may include discontinuing only the first fuel injection while adjusting the turbocharger settings based on the engine operating conditions and desired torque.

Now turning to FIG. 6, an example routine 600 is shown for adjusting a distribution of the first and second injection amounts based on engine operating conditions. The routine of FIG. 6 may be performed as part of the routine of FIG. 5, specifically at 510.

At 602, a desired exhaust gas mixture air-to-fuel ratio may be determined based on engine operating conditions. As such, this may correspond to the air-to-fuel ratio of a final exhaust gas mixture generated following release of cylinder combustion products into the exhaust manifold and exothermic reaction of the cylinder combustion products with a blow-through air-fuel mixture. At 604, a feed-forward total air amount may be received based on intake and/or exhaust valve settings and turbocharger settings. At 606, a total injection amount may be determined based on the feed-forward total air amount and the desired exhaust gas mixture air-to-fuel ratio.

At 608, a desired heat of oxidation may be determined based on engine operating conditions, including at least the catalyst temperature. For example, the actual catalyst temperature may be compared to a desired catalyst temperature (such as a catalyst light-off temperature) and the desired heat of oxidation may be determined based on the difference between the two. At 610, desired cylinder combustion conditions including a desired cylinder combustion air-to-fuel ratio, desired cylinder heat of combustion, desired cylinder temperature, etc., may be determined based on engine operating conditions.

At 612, a split ratio (or distribution) of a first injection amount, used to generate the blow-through air-fuel mixture, relative to a second injection amount, used to generate the cylinder combustion air-fuel mixture, is determined. At 614, based on the split ratio, the first and second injection amounts may be determined.

As such, the distribution of the total injection amount between the first and the second injection amounts determines the amount of heat that is directed to the exhaust catalyst. Since the first amount of fuel is injected during a positive valve overlap period, along with a boosted blow-through air flow (generated by operating a turbocharger during the positive valve overlap period), the fraction of fuel injected as the first injection amount largely accounts for heating the exhaust manifold. In comparison, since the second amount of fuel is injected into the cylinder after the positive valve overlap period, but while still in the intake stroke, the fraction of fuel injected as the second injection amount largely accounts for the cylinder combustion. Therefore, by increasing the fraction of fuel injected in the first injection amount, the heat of oxidation directed to the exhaust catalyst can be increased.

In one example, the split ratio of the first injection amount relative to the second injection amount may be adjusted based on an exhaust catalyst temperature, for example, by increasing the ratio of the first injection amount when the exhaust catalyst temperature is below a threshold temperature (e.g., light-off temperature). Irrespective of the distribution of fuel between the first and second injection amounts, a sum of the first and second injection amounts may be maintained constant so as to maintain an air-to-fuel ratio of the resulting exhaust gas mixture at a desired air-to-fuel ratio. For example, the sum of the injection amounts may be adjusted to maintain the exhaust gas mixture substantially at or around stoichiometry.

At 616, it may be determined whether any further air-to-fuel ratio (AFR) adjustments are needed. In one example, the engine may include an air-to-fuel ratio sensor in the engine exhaust, such as an exhaust gas oxygen (EGO) sensor. Feedback from the air-fuel ratio sensor may be used to adjust the overall air-to-fuel ratio in the exhaust gas by adjusting the first and/or second injection amounts. In this way, the feedback may be used to perform further adjustments to the blow-through air-fuel mixture and/or the cylinder combustion air-fuel mixture, to thereby adjust the resulting engine exhaust mixture air-to-fuel ratio. In one example, the adjustments made based on feedback from the air-fuel ratio sensor may cause the final exhaust mixture air-to-fuel ratio to oscillate around stoichiometry.

If no air-to-fuel ratio (AFR) adjustments are needed, the routine may end. If air-to-fuel ratio adjustments are needed, then at 618, the first and second injection amounts are further adjusted based on the air-to-fuel ratio feedback from the exhaust gas oxygen sensor, or alternate exhaust gas air-to-fuel ratio sensor. The air-to-fuel ratio adjustments may include, for example, during a first condition, adjusting the first injection amount but not the second injection amount responsive to the feedback. The first condition may include an engine cold-start condition. As such, during the cold-start condition, it may be crucial to bring the exhaust catalyst up to a light-off temperature, to reduce exhaust emissions. Thus, by adjusting only the first injection amount responsive to the air-to-fuel ratio feedback during cold-start conditions, a desired heat of oxidation may be accurately provided to heat the exhaust catalyst.

As another example, during a second condition, the second injection amount but not the first injection amount may be adjusted responsive to the feedback. As yet another example, during a third condition, each of the first and the second injection amount may be adjusted responsive to the feedback. In this way, by adjusting the first and/or second injection amounts responsive to air-to-fuel ratio feedback from an exhaust gas oxygen sensor, a desired heat of oxidation and a desired cylinder combustion may be achieved, while maintaining the final exhaust gas mixture at the desired air-to-fuel ratio.

It will be appreciated that the while the routines depicted in FIGS. 5-6 illustrate a second amount of fuel being injected in the intake stroke of the same combustion cycle as the first injection amount, this is not meant to be limiting. In alternate examples, the second injection amount may be injected in an intake stroke of a different combustion cycle as the first injection amount. The different combustion cycle may be, for example, a combustion cycle immediately preceding or immediately following the combustion cycle of the first injection amount. Thus, while the depicted example illustrates mixing the blow-through mixture of a cylinder with the products of a subsequent (e.g., immediately ensuing) cylinder combustion, in alternate examples, the second injection may precede the first injection such that the blow-through mixture is mixed with the products of a preceding (e.g., immediately preceding) cylinder combustion. In this case, the second injection may be performed before the intake valve closes for an intake stroke immediately preceding the valve overlap period where the first injection is performed. The first injection may precede the second injection or vice versa.

It will also be appreciated that while the depicted routine shows the first and second injection amounts being injected into the same cylinder, this is also not meant to be limiting. In alternate examples, as elaborated with reference to FIG. 7, the first injection amount may be injected in a first cylinder while the second injection amount is injected in a second cylinder, the first and second cylinders selected based on their firing order.

FIG. 7 shows an example map of engine cylinder positions for different cylinders of an engine. In the depicted example, four cylinders (cylinders 1-4) of an in-line engine are shown in the corresponding firing order.

Based on the position of each cylinder's piston at any time in the engine cycle, a given cylinder may be in an intake stroke (I), a compression stroke (C), a power stroke (P), or an exhaust stroke (E). For any given cylinder, the positive valve overlap period corresponds to a narrow window (represented herein by a hatched bar) towards the end of the exhaust stroke and the beginning of the intake stroke of the given cylinder. A controller may inject the first amount of fuel in a first cylinder during the positive valve overlap period of the first cylinder. The controller may then select a second, different cylinder, for injecting the second amount of fuel within an intake stroke of the second cylinder, but outside of the positive valve overlap period of the second cylinder.

The first and second cylinders may be selected based on their firing order. For example, cylinders may be selected such that the blow-through mixture and the cylinder combustion mixture are generated at substantially the same time. In one example, the cylinder selection includes a first cylinder and a second cylinder wherein a positive valve overlap period of the first cylinder overlaps the exhaust stroke (depicted herein by a bar with diagonal lines) of the second cylinder. Since the cylinder combustion mixture is exhausted in the exhaust stroke of the cylinder, by injecting the first amount of fuel in the valve overlap period of the first cylinder and the second amount of fuel in the intake stroke of a second cylinder that has an exhaust stroke that overlaps the valve overlap period of the first cylinder, a mixing and exothermic reaction of the blow-through mixture with the cylinder combustion mixture in the exhaust manifold may be improved.

With reference to the map of FIG. 7, as a non-limiting example, the engine controller may inject the first amount in Cylinder 2 during the valve overlap period, while injecting the second amount in Cylinder 1, during the intake stroke of a preceding combustion cycle. As another example, the engine controller may inject the first amount in Cylinder 3 during the valve overlap period, while injecting the second amount in Cylinder 4, during the intake stroke of a preceding combustion cycle. As such, still other combinations may be possible.

Figure 8:
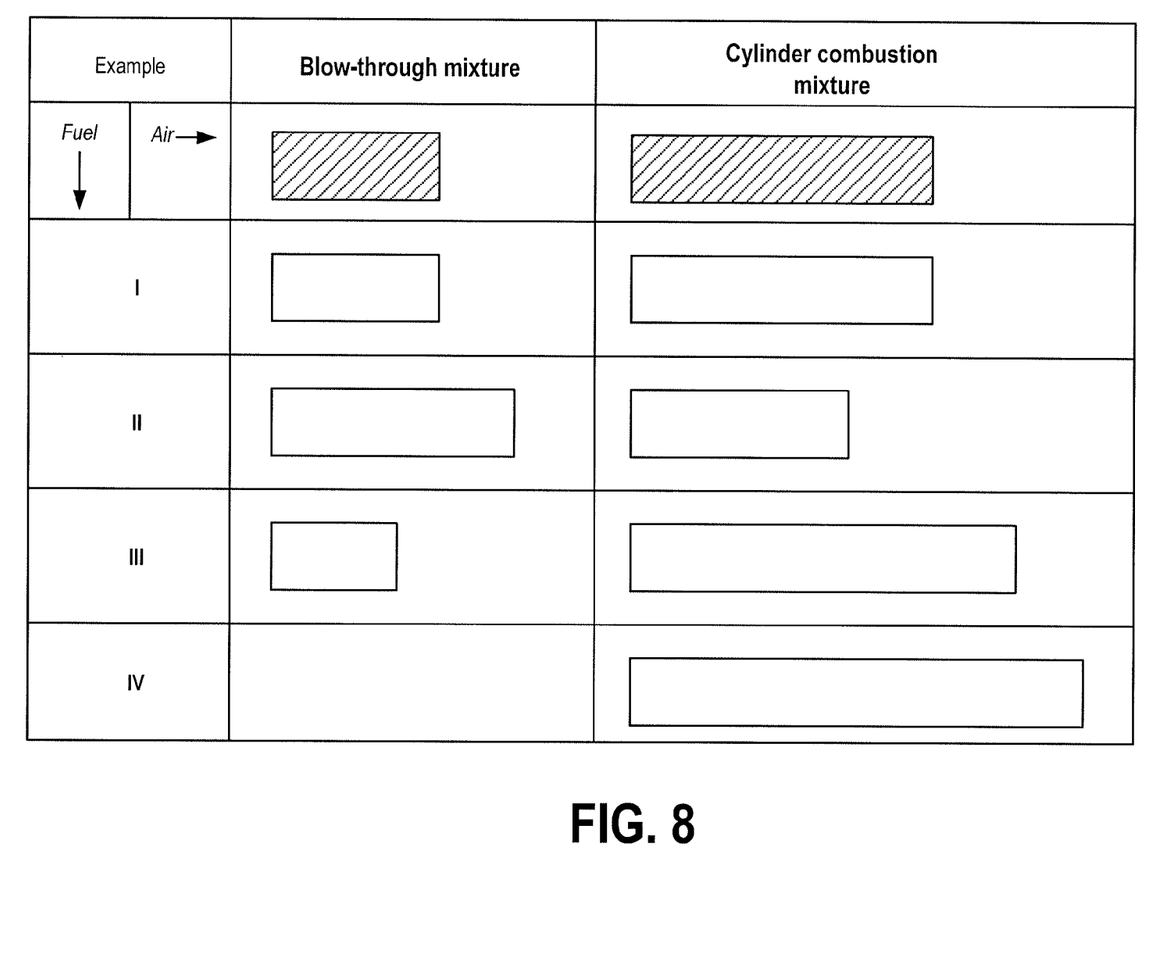
FIG. 8 shows example blow-through air-fuel mixtures and cylinder combustion mixtures that may be used to expedite catalyst heating, according to the present disclosure.

Now turning to FIG. 8, example blow-through air-fuel mixtures and cylinder combustion mixtures are depicted that may be used to expedite catalyst heating. In particular, example distributions of fuel between a first injection amount in a blow-through mixture, and a second injection amount in a cylinder combustion mixture, are shown. In all the depicted examples, the different distributions are used to vary the amount of heat delivered to an exhaust catalyst while maintaining a final exhaust gas mixture air-to-fuel ratio substantially at stoichiometry.

For each of the blow-through mixture and the cylinder combustion mixture, a feed-forward air amount may be determined (represented herein by corresponding hatched bars). The feed-forward air amount for the blow-through mixture as well as the cylinder combustion mixture may be based on boost settings of the turbocharger, as well as intake and exhaust valve settings (e.g., valve opening, valve closing, duration of valve opening, duration of valve overlap, etc.). In the depicted example, the blow-through mixture may include a larger amount of air as compared to the cylinder combustion mixture.

Example I depicts a first example of a fuel distribution (represented herein by corresponding solid bars) between the blow-through mixture and the cylinder combustion mixture. Herein, a first injection amount is adjusted to be proportional to the blow-through air amount so that a substantially stoichiometric blow-through mixture is generated. Likewise, a second injection amount is adjusted to be proportional to the cylinder combustion air amount so that a substantially stoichiometric cylinder combustion mixture is generated. Thus, in example I, a stoichiometric blow-through air-fuel mixture may be mixed with a stoichiometric cylinder combustion air-fuel mixture in the exhaust manifold to generate heat at the exhaust catalyst, while maintaining the resulting exhaust gas mixture at stoichiometry.

As such, it will be appreciated that herein the fuel amount being proportional to the air amount does not imply a 1:1 air:fuel ratio. Rather, it implies a ratio required to generate a stoichiometric mixture (e.g., 14.6:1 air:fuel). However, in alternate examples, the air:fuel ratio may be different (e.g., a 1:1 ratio) based on the desired air-to-fuel ratio of each mixture.

Example II depicts another example fuel distribution. Herein, the first injection amount is adjusted to be larger in proportion to the blow-through air amount so that a rich blow-through mixture is generated. The second injection amount is correspondingly decreased to maintain the total injection amount constant. Consequently, the second injection amount is smaller in proportion to the cylinder combustion air amount such that a lean cylinder combustion mixture is generated. Thus, in example II, a rich blow-through air-fuel mixture may be mixed with a lean cylinder combustion air-fuel mixture in the exhaust manifold to generate more heat (relative to examples I and III) at the exhaust catalyst while maintaining the resulting exhaust gas mixture at stoichiometry. The fuel distribution of example II may be used during a first engine cold-start condition wherein the temperature of the exhaust catalyst is lower than a threshold and below a catalyst light-off temperature.

Example III depicts yet another example fuel distribution. Herein, the first injection amount is adjusted to be smaller in proportion to the blow-through air amount so that a lean blow-through mixture is generated. The second injection amount is correspondingly increased to maintain the total injection amount constant. Consequently, the second injection amount is larger in proportion to the cylinder combustion air amount such that a rich cylinder combustion mixture is generated. Thus, in example III, a lean blow-through air-fuel mixture may be mixed with a rich cylinder combustion air-fuel mixture in the exhaust manifold to generate less heat (relative to examples I and II) at the exhaust catalyst while maintaining the resulting exhaust gas mixture at stoichiometry. The fuel distribution of example III may be used during a second engine cold-start condition wherein the temperature of the exhaust catalyst is higher than the threshold but still below the light-off temperature. Alternatively, the fuel distribution of example III may be used when a richer cylinder combustion is desired to limit NOx emissions and/or meet higher torque demands.

Example IV depicts yet another example wherein instead of distributing fuel between a first and second injection, all the fuel is injected in one injection. Specifically, boosted blow-through air, with no added fuel, is directed to the engine exhaust through the engine cylinders, during the valve overlap period. The boosted blow-through air flow is then exothermically reacted with a rich cylinder combustion mixture in the exhaust manifold to generate more heat at the exhaust catalyst while maintaining the resulting exhaust gas mixture at stoichiometry. Herein, the cylinder combustion may either precede the boosted blow-through air flow, such that the fresh air of the blow-through air flow is exothermically reacted with the combustion products of a preceding cylinder combustion event, or the cylinder combustion may immediately follow the boosted blow-through air flow, such that the fresh air of the blow-through air flow is exothermically reacted with the combustion products of an immediately ensuing cylinder combustion event.

In this way, by injecting some fuel into an engine cylinder along with a boosted blow-through air flow, through the cylinder and into the engine exhaust, a well-mixed blow-through air-fuel mixture may be generated at the exhaust. By injecting and combusting some fuel in an engine cylinder during the intake stroke, a cylinder combustion mixture may be generated. By mixing the blow-through air-fuel mixture with the cylinder combustion products in the exhaust, a combustion reaction may be generated that increases the heat at an exhaust emission control device and expedites attainment of catalyst light-off temperatures. By varying the distribution of fuel injected in a cylinder with the blow-through airflow as compared to fuel combusted in a cylinder, the amount of oxidation heat directed to the catalyst can be varied while maintaining the exhaust mixture at a desired air-to-fuel ratio. By rapidly increasing the catalyst temperature, the catalyst light-off time may be decreased and the quality of emissions may be improved.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of operating a boosted engine, comprising, during an engine cold start,
operating the engine with positive intake to exhaust valve overlap to drive a boosted blow-through airflow into an engine exhaust through engine cylinders;
injecting, in a first injection, a first amount of fuel during the overlap;
injecting, in a second injection, a second amount of fuel outside of the overlap; and
exothermically reacting the blow-through airflow with fuel in the exhaust.

2. The method of claim 1, wherein the first injection amount and second injection amount are injected in the same engine cylinder.

3. The method of claim 1, wherein the first injection amount is injected in a first engine cylinder and the second injection amount is injected in a second engine cylinder, the first and second engine cylinders selected based on their firing order.

4. The method of claim 1, wherein the second injection amount is injected in an intake stroke of the same combustion cycle as the first injection amount.

5. The method of claim 1, wherein the second injection amount is injected in an intake stroke of a different combustion cycle as the first injection amount.

6. The method of claim 5, wherein the different combustion cycle is either a combustion cycle immediately preceding or immediately following a combustion cycle of the first injection amount.

7. The method of claim 1, wherein a sum of the first and second injection amounts is adjusted to maintain an overall air-fuel ratio in the exhaust at a desired air-to-fuel ratio, and wherein a ratio of the first injection amount relative to the second injection amount is adjusted based at least on an exhaust catalyst temperature.

8. The method of claim 7, wherein the first and second injection amounts are further adjusted based on air-to-fuel ratio feedback from an exhaust gas oxygen sensor.

9. The method of claim 1, wherein the engine cold start includes at least one of a catalyst temperature being below a threshold temperature, and the engine being in an engine-off condition for greater than a threshold duration.

* * * * *